United States Patent
Kottu et al.

(10) Patent No.: US 9,477,704 B1
(45) Date of Patent: Oct. 25, 2016

(54) SENTIMENT EXPRESSION ANALYSIS BASED ON KEYWORD HIERARCHY

(71) Applicant: Teradata US, Inc, Dayton, OH (US)

(72) Inventors: Rajeswara R. Kottu, Cary, NC (US); Joshua D. Anderson, Fuquay-Varina, NC (US); Harold R. Lee, Holly Springs, NC (US); Ara Yapejian, Raleigh, NC (US)

(73) Assignee: Teradata US, Inc., Dayton, OH (US)

( * ) Notice: Subject to any disclaimer, the term of this patent is extended or adjusted under 35 U.S.C. 154(b) by 235 days.

(21) Appl. No.: 14/135,515

(22) Filed: Dec. 19, 2013

Related U.S. Application Data

(60) Provisional application No. 61/747,690, filed on Dec. 31, 2012.

(51) Int. Cl.
G06F 17/30 (2006.01)

(52) U.S. Cl.
CPC .............. *G06F 17/30386* (2013.01)

(58) Field of Classification Search
USPC .................. 707/748, 752, 708, 48
See application file for complete search history.

(56) References Cited

U.S. PATENT DOCUMENTS

| | | | | |
|---|---|---|---|---|
| 7,143,089 B2 * | 11/2006 | Petras | ............... | G06F 17/30699 704/1 |
| 8,606,815 B2 * | 12/2013 | Chen | ................. | G06F 17/30705 707/737 |
| 8,655,938 B1 * | 2/2014 | Smith | ................... | G06F 17/3053 706/45 |
| 8,918,312 B1 * | 12/2014 | Rehling | .............. | G06F 17/2785 704/9 |
| 9,092,514 B2 * | 7/2015 | Cardie | | |
| 2006/0069589 A1 * | 3/2006 | Nigam | ................... | G06Q 30/02 706/55 |
| 2009/0048823 A1 * | 2/2009 | Liu | ..................... | G06F 17/2765 704/9 |
| 2009/0112892 A1 * | 4/2009 | Cardie | ............. | G06F 17/30719 |
| 2009/0119157 A1 * | 5/2009 | Dulepet | ............. | G06F 17/2785 705/7.29 |
| 2009/0193011 A1 * | 7/2009 | Blair-Goldensohn | ...... | G06F 17/30719 |
| 2009/0282019 A1 * | 11/2009 | Galitsky | .......... | G06F 17/30634 |
| 2010/0262454 A1 * | 10/2010 | Sommer | ............... | G06Q 30/02 706/20 |
| 2012/0041937 A1 * | 2/2012 | Dhillon | ............. | G06F 17/30731 707/708 |
| 2012/0246054 A1 * | 9/2012 | Sastri | .................... | G06Q 50/01 705/37 |
| 2012/0290910 A1 * | 11/2012 | Kumar | ......................... | 715/205 |
| 2013/0046771 A1 * | 2/2013 | Moitra | ............. | G06F 17/30705 707/749 |
| 2013/0091117 A1 * | 4/2013 | Minh | ................ | G06F 17/30707 707/709 |
| 2013/0124192 A1 * | 5/2013 | Lindmark | ............. | G06F 17/274 704/9 |
| 2013/0173333 A1 * | 7/2013 | Zhang | ................... | G06Q 50/01 705/7.29 |
| 2013/0297546 A1 * | 11/2013 | Woods-Holder | ...... | G06F 17/271 706/46 |
| 2013/0311485 A1 * | 11/2013 | Khan | .................. | G06F 17/2785 707/748 |
| 2014/0040288 A1 * | 2/2014 | Galitsky | ........... | G06F 17/30684 707/755 |
| 2014/0114978 A1 * | 4/2014 | Chatterjee | .............. | G06Q 50/01 707/739 |

\* cited by examiner

*Primary Examiner* — Hanh Thai

(74) *Attorney, Agent, or Firm* — Randy L. Campbell, Jr.

(57) ABSTRACT

A sentiment-scoring system may include a storage device configured to store a plurality of keywords, keyword groups, and a keyword group hierarchy. Each keyword may be associated with at least one of the keyword groups. The keyword hierarchy may include a hierarchy associated with each keyword group. The system may further include a processor in communication with the storage device. The processor may be configured to locate a plurality of sentiment expressions and identify a plurality of keywords present in the plurality of sentiment expressions. The processor may be further configured to determine at least one respective keyword group associated with each identified keyword and determine a sentiment score for each sentiment expression with respect to the associated keyword group within the keyword hierarchy. The processor may be further configured to provide at least one sentiment score to a display. A method and computer-readable medium may also be implemented.

20 Claims, 6 Drawing Sheets

SENTIMENT EXPRESSION ANALYSIS BASED ON KEYWORD HIERARCHY

CLAIM OF PRIORITY

This application claims the benefit of priority under 35 U.S.C. §119(e) of U.S. Provisional Patent Application Ser. No. 61/747,690 filed on Dec. 31, 2012, which is hereby incorporated by reference herein in its entirety.

BACKGROUND

Enterprises are typically sensitive to the opinions of the public. For example, businesses are very interested in the general sentiment held, as well as sentiment for services, products, or operational aspects, such as customer service. Currently, large amounts of data are available across the Internet and other network systems that express some level of sentiment for numerous enterprises, individuals, etc. This data may reside at social media websites, message boards, etc. These expressions of sentiment may be analyzed by enterprises. However, many enterprises analyze sentiment expressions one-by-one. Analyses performed at this level fail to recognize sentiment expression relationships that offer additional layers of granularity.

SUMMARY

According to one aspect of the disclosure, a sentiment-scoring system may include a storage device. The storage device may be configured to store a plurality of keywords, keyword groups, and a keyword group hierarchy. Each keyword may be associated with at least one of the keyword groups. The keyword hierarchy may include a hierarchy associated with each keyword group. The sentiment-scoring system may further include a processor in communication with the storage device. The processor may be configured to locate a plurality of sentiment expressions. The processor may be further configured to identify a plurality of keywords present in the plurality of sentiment expressions. The processor may be further configured to determine at least one respective keyword group associated with each identified keyword. The processor may be further configured to determine a sentiment score for each sentiment expression with respect to the associated keyword group within the keyword hierarchy. The processor may be further configured to provide at least one sentiment score to a display.

According to another aspect of the disclosure, a method may include locating a plurality of sentiment expressions. The method may further include identifying a plurality of predetermined keywords present in the plurality of sentiment expressions. Each keyword may be included in at least one of a plurality of keyword groups. Each keyword group may include an associated keyword hierarchy. The method may further include determining at least one respective keyword group associated with each identified keyword. The method may further include determining a sentiment score for each sentiment expression with respect to the associated keyword group within the keyword hierarchy. The method may further include providing at least one sentiment score to a display.

According to another aspect of the disclosure, a computer-readable medium may be encoded with a plurality of instructions executable by a processor. The plurality of instructions may include instructions to locate a plurality of sentiment expressions. The plurality of instructions may further include instructions to identify a plurality of predetermined keywords present in the plurality of sentiment expressions. Each keyword may include at least one of a plurality of keyword groups. Each keyword group may include an associated keyword hierarchy. The plurality of instructions may further include instructions to determine at least one respective keyword group associated with each identified keyword. The plurality of instructions may further include instructions to determine a sentiment score for each sentiment expression with respect to the associated keyword group within the keyword hierarchy. The plurality of instructions may further include instructions to provide at least one sentiment score to a display.

BRIEF DESCRIPTION OF THE DRAWINGS

The disclosure may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE FIGURES

Figure 1:
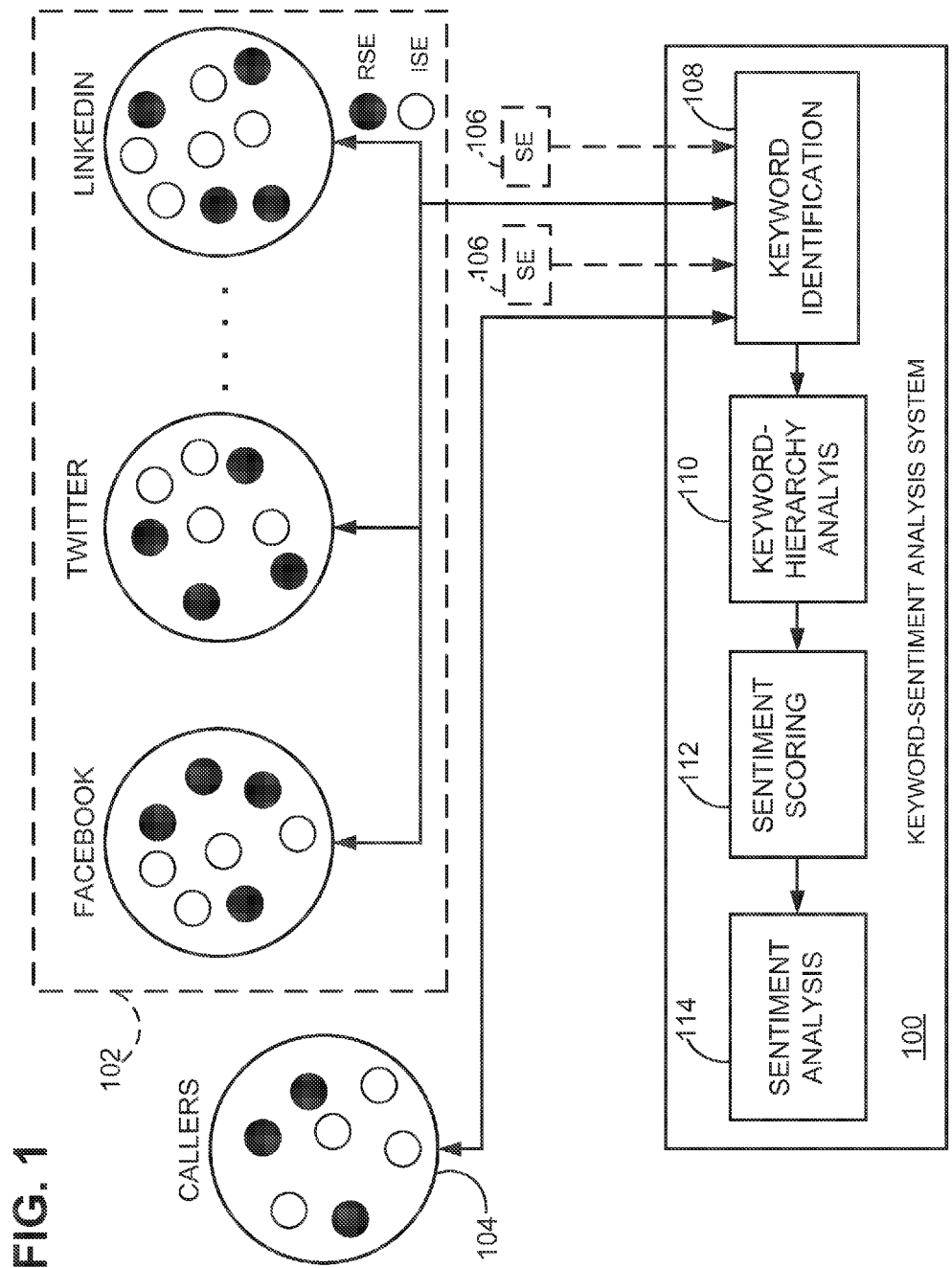
FIG. 1 is a block diagram of an example keyword-sentiment analysis system.

FIG. 1 is a block diagram of a system used to organize expressions of sentiment into a keyword-based hierarchy allowing keyword-based sentiment analysis and scoring. Expressions of sentiment regarding enterprises have become ubiquitous on the Internet due to the explosion of social media websites, product/services review websites, etc. Many of these social media sites, such as Facebook, Twitter, etc., allow individuals to freely express sentiment through comments, emoticons, and other manners. Other websites provide message boards, review webpages, etc., that prompt individuals to provide sentiment regarding enterprise aspects. In one example, a keyword-based sentiment analysis system 100 may identify these sentiment expressions across various Internet websites and other manners of communication and analyze them to determine sentiment regarding various aspects of interest of an enterprise or other entity. Websites 102 may include social media websites, as shown in FIG. 1, such as Facebook, Twitter, and LinkedIn. Each account of these websites may allow users to provide access to the website to allow sentiment expressions to be provided on almost an unlimited number of topics. Enterprises may desire to locate relevant sentiment expressions. For example, an electronics-based organization may desire to locate sentiment regarding customer service or particular products the organization sells. The organization may also be interested in not only locating the sentiment expressions, but evaluating the content to determine the level of sentiment itself, such as positive or negative sentiment.

The keyword-sentiment analysis system 100 may locate these expressions of sentiment and organize them according to a predetermined hierarchy allowing sentiment to be analyzed with a particular level of granularity. In one example, the keyword-sentiment analysis system 100 may identify sentiment expression found on websites 102, through callers 104 via call centers, or any other communications system that allows sentiment expression to be located and retrieved.

In FIG. 1, each filled circle represents a relevant sentiment expression (RSE) including those found on the websites and those provided via calls. The unfilled circles represent irrelevant sentiment expressions (IRE) that are not relevant to the enterprise seeking sentiment expressions. Sentiment expressions (SE) 106 may be located and retrieved by the keyword-sentiment analysis system 100. Once the sentiment expressions 106 are located, the keyword-sentiment analysis system 100 may perform keyword identification 108 that may identify predetermined keywords found in the sentiment expressions 106. Keyword identification 108 may allow the sentiment expressions 106 that contain predetermined words or phrases, referred to as "keywords," to be organized according to a keyword hierarchy. The keyword-sentiment analysis system 100 may perform keyword-hierarchy analysis 110. Keyword hierarchy analysis 110 may involve mapping the sentiment expressions to one or more keyword groups associated with the keyword(s) identified in the sentiment expressions. Each keyword group may include various keyword subgroups (see FIGS. 2 and 3) of a hierarchical nature. The established hierarchies may allow sentiment expressions 102 to be analyzed on various levels of granularity. Upon establishment mapping the sentiment expression to the keyword hierarchy, the keyword-sentiment analysis system 100 may perform sentiment scoring 112 used to provide sentiment scores for various levels of the keyword hierarchy. The sentiment scores may provide a quantitative metric indicative of a level of sentiment regarding various aspects covered by the keyword hierarchy. The sentiment scoring may allow sentiment analysis 114 to be used by the keyword-sentiment analysis system 100. The sentiment analysis 114 may organize the scores into a predetermined or selected format. The sentiment analysis 114 may also allow qualitative indicators to be applied to the sentiment scores for presentation. For instance, if sentiment scores for a keyword group are above a predetermined threshold, the sentiment analysis may indicate that the sentiment regarding aspects covered by the keyword group are "good," while sentiment scores less than the threshold may be "bad." Various levels of sentiment may be used to provide finer granularity.

Figure 2:
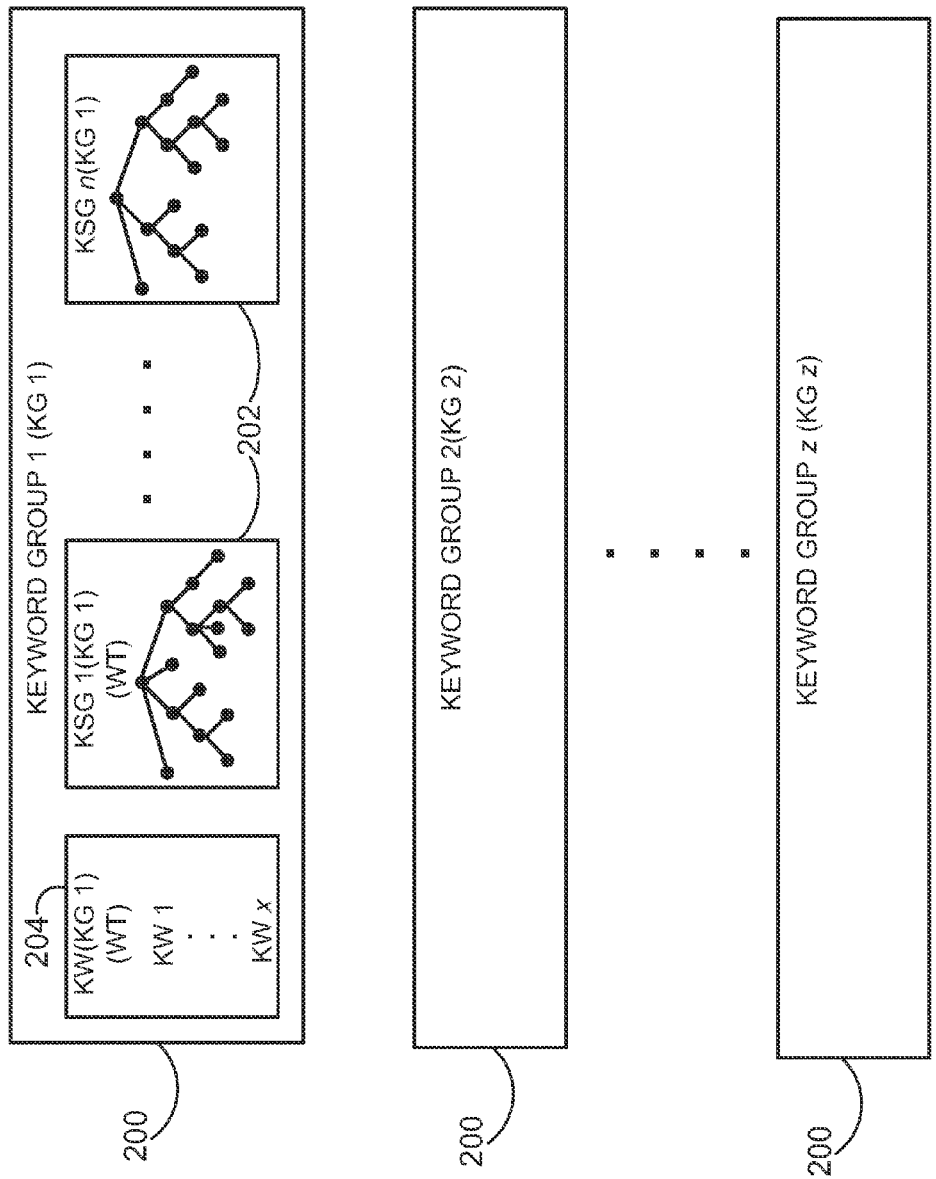
FIG. 2 is a block diagram of a plurality of keywords groups.

FIG. 2 is a block diagram of a plurality of keyword groups 200, individually designated as KG 1 through KG z, where z is the number of keyword groups 200. Each keyword group 200 may include a plurality of keyword subgroups 202 and keywords 204. In one example, each keyword group 200 may be associated with a type, such as competitor type, location type, or product type, for example. The competitor type may indicate competitors and competitor product lines as keyword subgroups 202. The location type may indicate particular geographical location, such as store location. The product type may indicate various product lines associated with an enterprise.

In FIG. 2, the keyword group KG 1 includes keyword subgroups KSG 1 through KSG n, where n is the number of keyword subgroups 202 in the keyword group KG 1. Each keyword subgroup 202 may include additional subgroups arranged hierarchically (see FIG. 3). Each keyword subgroup 202 may include an associated weight that reflects a relative percentage of importance regarding sentiment associated with the particular keyword group. Each keyword in the keywords 204 may also have a respective relative weight. Thus, the weights for the keyword subgroups 202 and the keywords 204 may each represent a fraction summing to one.

Figure 3:
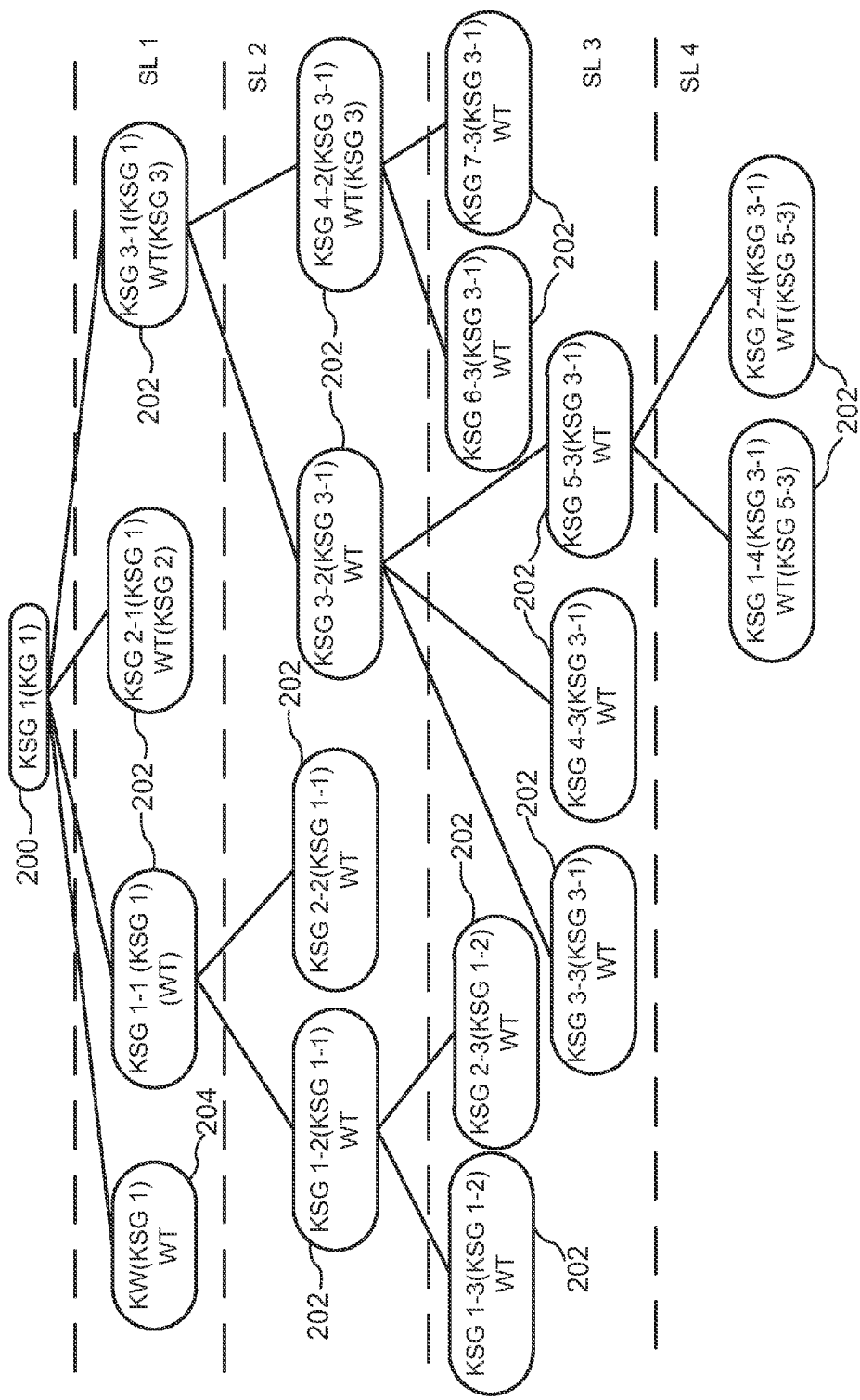
FIG. 3 is an example keyword group hierarchy.

FIG. 3 is an example of the keyword subgroup KSG 1 and other associated subgroups. Each keyword subgroup 202 may include one or more sub-levels of child subgroups. For example, the keyword subgroup KSG 1 includes four sub-levels, SL 1 through SL 4. Each keyword subgroup 202 in the sub-levels has a parent keyword subgroup 200. In FIG. 3, for ease of illustration, each keyword subgroup 202 has a reference number that includes an index and a reference to the sublevel. For example, in keyword subgroup KSG 2-1(KSG 1), the "2-1" indicates an index "2" and a sub-level "1." The parenthetical (KSG 1) refers to the parent keyword subgroup, which in this example is KSG 1. Keyword groups 204 may also be used at each sublevel, such as KW(KSG 1), which indicates all keywords associated with the keyword subgroup KSG 1.

In one example, each child keyword subgroup 202 and keyword group 204 may indicate a finer level of granularity than the parent keyword subgroup 200. Thus, keywords for the keyword subgroup 202 associated with keyword subgroup KSG 1 may allow sentiment expressions associated with the child keyword subgroups 202 to be used to determine sentiment for different aspects of keyword subgroup KSG 1. Furthermore, allowing multiple sub-levels provides increasing levels of granularity.

Each keyword subgroup 202 includes an associated relative weight (WT) indicative of the relative importance with respect to the parent subgroup. Thus, for example keyword subgroup KSG 3-2 includes three child keyword subgroups KSG 3-3, 4-3, and 5-3. Each of these child keyword subgroups 202 contains a weight (WT) indicating a relative level of importance to sentiment regarding the parent keyword subgroup KSG 3-3. Thus, the weights of these child keyword subgroups 202 sum to one. Sentiment expressions identified that contain keywords associated with any of the child keyword subgroups KSG 3-3, 4-4, and 5-4 may be associated with these child keyword subgroups 200 when scored to provide a particular sentiment expression score for each of the child keyword subgroups. Each of these scores may be used to find an overall sentiment score for the parent keyword subgroup KSG-3-3. Thus, each parent keyword subgroup may include a sentiment score that is a combination of all child keyword subgroups and keyword groups. However, each keyword subgroup 202 that terminates a branch of the hierarchy may include its own sentiment score. For example, keyword subgroup KSG 2-1 has no children keyword subgroups 202 or keywords 204. Thus, it may simply include a set of keywords associated with a particular aspect.

Figure 4:
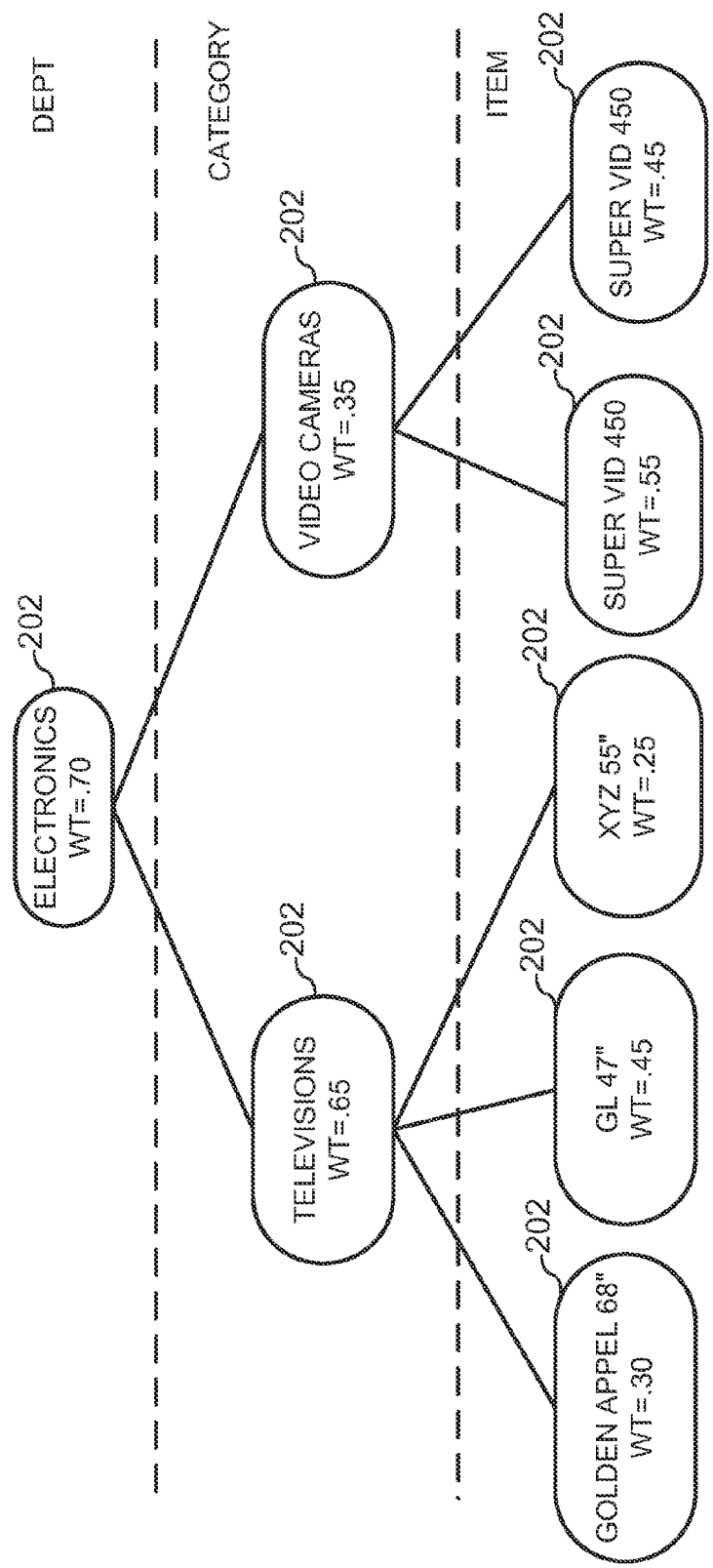
FIG. 4 is an example of a portion of a keyword group hierarchy.

FIG. 4 is an example of how specific keywords may be used within a keyword group hierarchy. FIG. 4 provides a portion of a keyword group hierarchy. In the hierarchy portion 400, a keyword subgroup may be associated with a department of a business. The keyword subgroup 202 may be based on the electronics department, with keyword subgroups 202 for categories "televisions" and "video cameras." Each of the category subgroups may include child keyword subgroups associated with specific products under either televisions or video cameras. Thus, in order to find a sentiment score for the electronics department, the keyword-sentiment analysis system may identify sentiment expression from the various sources such as websites, call center calls, etc., as previously discussed. If these keywords match up with any of the keywords associated with the keyword subgroups 202, a sentiment score for the identified sentiment expression may be determined and associated with relevant keyword subgroups. For example, if a sentiment expression on a Facebook status indicates that an individual did not care for the XYZ 55" television, this sentiment expression may be found and associated with the "XYZ 55"" keyword subgroup. The sentiment score may indicate the sentiment regarding that particular television. Similarly, sentiment expressions may be identified for each of the other televisions. These sentiment expressions may be scored and the weights may be applied and the weighted sentiment scores may be aggregated. These weighted scores may be used for an overall score for the televisions keyword subgroup. Thus, the weighted scores may indicate an overall sentiment associated with "televisions" parent subgroup. Child keyword subgroups allow layers of increased granularity as more sub-levels are created.

Similarly, sentiment expressions may be found for the various video cameras at the item level and the sentiment expression may be scored. The weighted scores may be aggregated and provide an overall sentiment score for the video cameras. The video camera and television scores may be weighted and aggregated to provide an overall score for the electronics department. The electronics department may include a weight (0.70) to be applied for generating any overall sentiment scores of any parent keyword subgroups 202.

Figure 5:
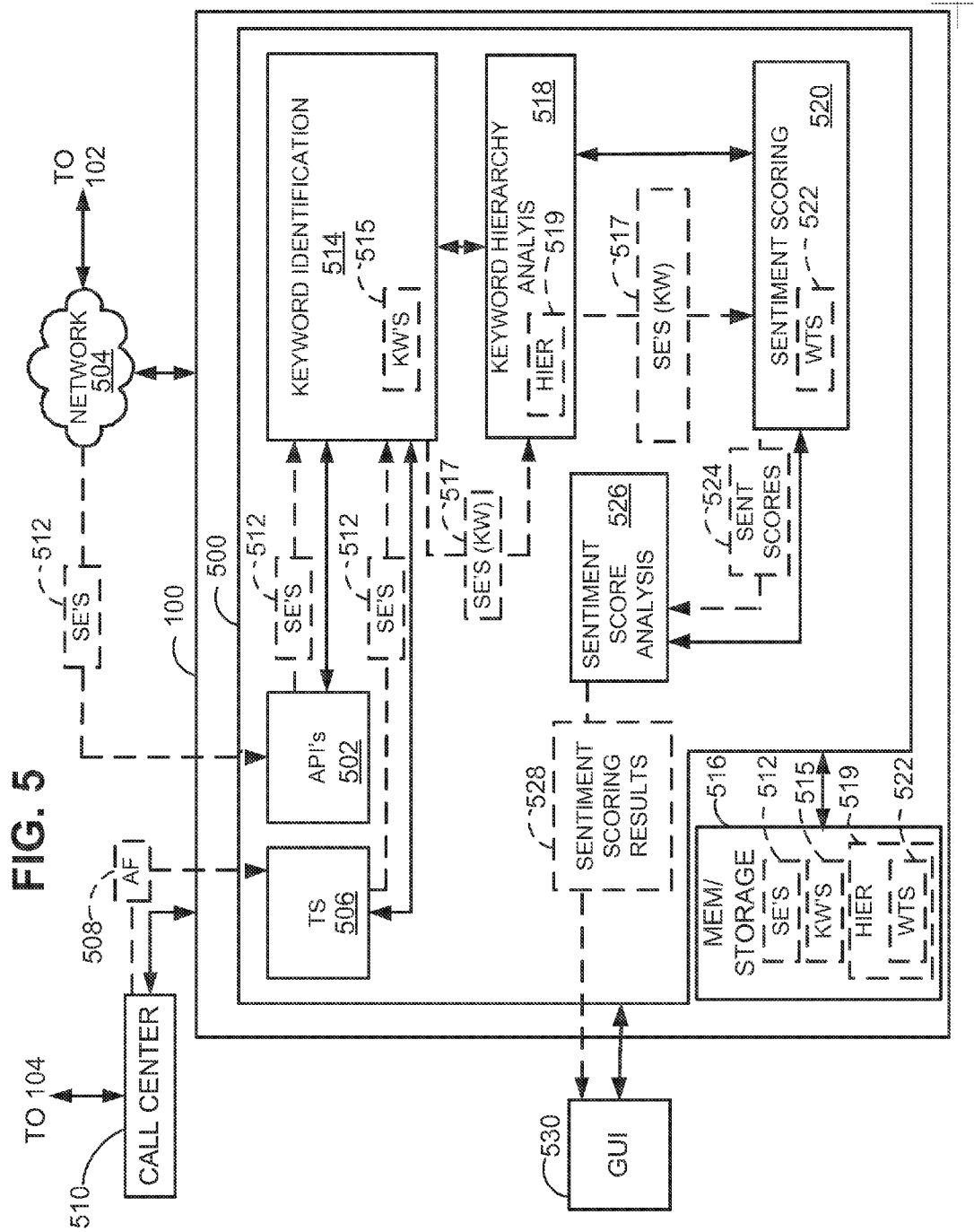
FIG. 5 is a block diagram of example operation of the keyword-sentiment analysis system.

FIG. 5 is a block diagram providing example operation of the keyword-sentiment analysis system 100. In one example, the keyword-sentiment analysis system 100 may be executed on a processor 500. The keyword-sentiment analysis system 100 may include application program interfaces (APIs) 502. The APIs 502 may be used to identify relevant sentiment expressions found on various websites 102 or other network-based location via a network 504. The network 504 may be wired, wireless, or some combination thereof. The network 504 may be a virtual private network, web-based, directly-connected, or some other suitable network configuration. Each API 502 may be configured to access a particular website to locate and retrieve relevant sentiment expressions. Various websites allow users to grant permission to other web services to view personal information. The APIs 502 may access accounts granting such permission or those lacking any prohibitive privacy settings.

The keyword-sentiment analysis system 100 may also include a transcription system 506 that may receive audio files (AF) 508 of calls from a call center 510 and transcribe the calls to allow the resultant text to be analyzed for sentiment expression. In alternative examples, transcription of the calls may be performed at the call center 510 and text of the calls may be provided to the keyword-sentiment analysis system 100.

The APIs 502 and transcription system 506 may provide sentiment expressions 512 to a keyword-identification module 514. The keyword identification module 514 may access a library of keywords 515 (KW's) that may be stored in and accessed from memory/storage 516. The keyword-identification module 514 may identify these keywords that the sentiment expressions 512 may contain. Each keyword-containing sentiment expression 517 may be selected by the keyword-identification module 514 may be provided to a keyword-hierarchy analysis module 518. The keyword-hierarchy analysis module 518 may retrieve a keyword hierarchy (HIER) 519 from the memory/storage 516, such as that described with regard to FIGS. 2 and 3. In one example, keyword-hierarchy analysis module 518 may determine to which keyword group 200 each keyword-containing sentiment expression 514 is associated. Based on this selection, the relevant keyword subgroups 202 to apply to the keyword-containing sentiment expressions 517 may be determined.

Upon association with the appropriate keyword hierarchies, the keyword-containing sentiment expressions 517 may be received by a sentiment scoring module 520. The sentiment-scoring module 520 may include one or more sentiment scoring algorithms, such as GATE, Balie, and LingPipe, for example, or any suitable scoring algorithm. The sentiment-scoring module 520 may generate quantitative scores for each keyword-containing sentiment expressions 517 and may retrieve weights values 522 (WTS) of the keyword hierarchies 519 to provide the weighted scores for parent subgroups as described by FIGS. 2 and 3. The sentiment scores may reflect the level of sentiment contained in the keyword-containing sentiment expressions 517. Relatively higher scores may reflect a relatively more positive sentiment regarding the aspect at which the sentiment expression is directed. The sentiment scores 524 may be provided to a sentiment-score analysis module 526. The sentiment score analysis module 526 may allow the quantitative sentiment scores 524 to be organized in a particular fashion or may convert the quantitative scores to qualitative indicators of a sentiment level. The sentiment scoring results 528 produced by the sentiment score analysis module 526 may be provided to a graphical user interface (GUI) 530. The GUI 530 may include a processor and memory/storage and include one or more interface features, such as a display, keyboard, monitor, mouse, etc. The GUI 530 may represent various types of devices capable of interfacing with a computer system, such as a smartphone, PC, mainframe, etc. The GUI 530 may be used to access specific keyword groups, subgroups, keywords, etc. allowing the GUI 530 to retrieve sentiment scores at various levels of granularity for display and analysis.

During operation, the keyword-sentiment analysis system 100 may collect sentiment expressions 512 at predetermined or actively selected periods of time. The sentiment expressions 512 may be stored in the memory/storage 516. A request for sentiment scoring to be performed may be received by the keyword-sentiment analysis system 100 via the GUI 530 or some other user interface device. Upon such request, the sentiment expressions 512 may be retrieved by the keyword-identification module 514 for processing. In addition, weight values 522 may be changed through user-input to reflect current weighting considerations of subgroups. Without input, each subgroup may be a default weight factor that is equal among subgroups associated with the same parent subgroups.

The keyword-sentiment analysis system 100 may be implemented in many different ways. Each module may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory/storage 516, for example, that comprises instructions executable with the processor 500 or other processor to implement one or more of the features of the module. When any one of the module includes the portion of the memory that comprises instructions executable with the processor, the module may or may not include the processor. In some examples, each module may just be the portion of the memory/storage 516 or other physical memory that comprises instructions executable with the processor 500 or other processor to implement the features of the corresponding module without the module including any other hardware. Because each module includes at least some hardware even when the included hardware comprises software, each module may be interchangeably referred to as a hardware module, such as the keyword-identification hardware module 514.

Figure 6:
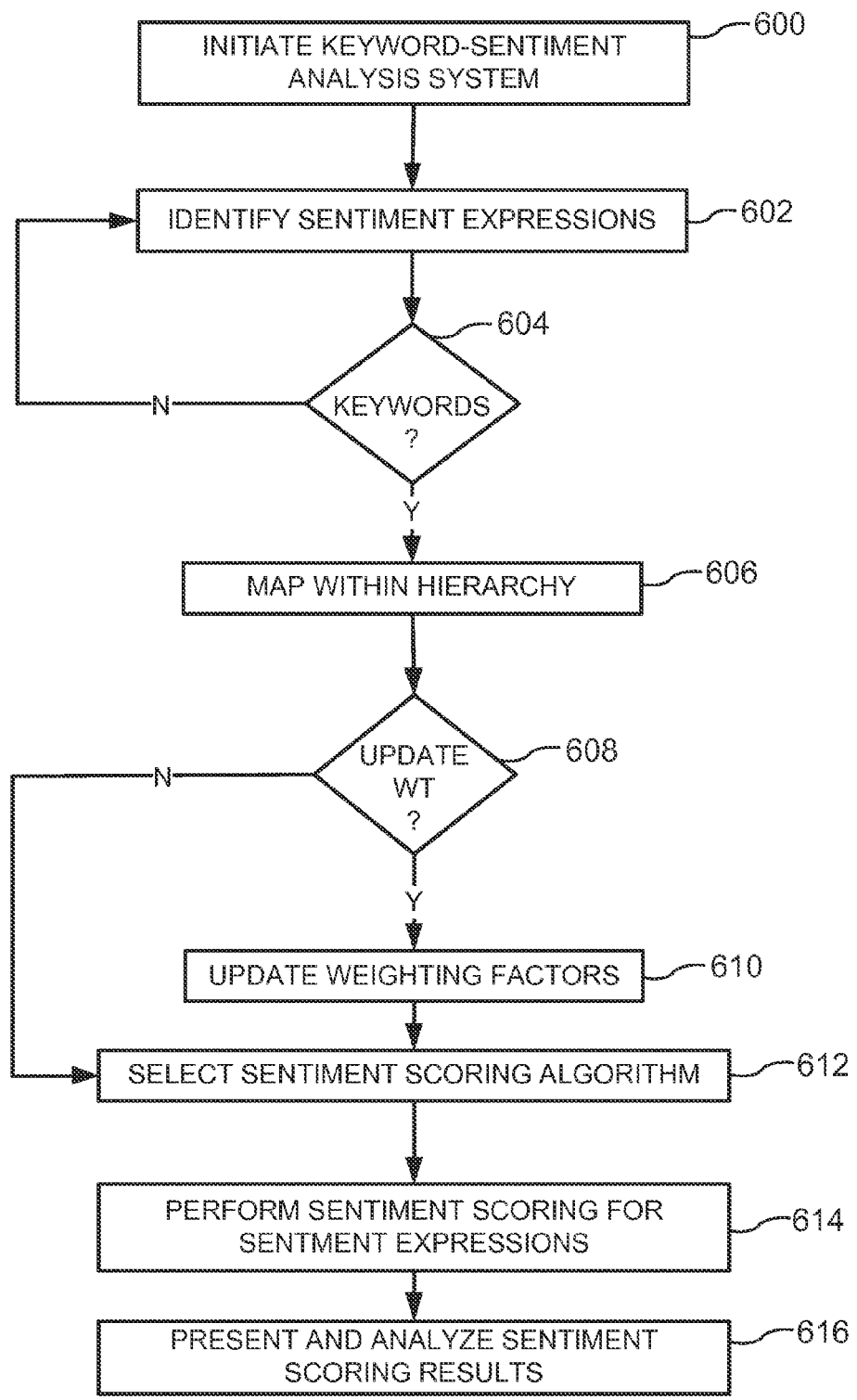
FIG. 6 is an operational flow diagram of example operation of the keyword-sentiment analysis system of FIG. 5.

FIG. 6 is an operational flow diagram of example operation of the keyword-sentiment analysis system 100. In one example, the keyword-sentiment analysis system 100 may be initiated (600) by user input via a device such as the GUI 530 or may be initiated based on one or more triggering conditions such a predetermined times or a predetermined number of sentiment expressions being identified, for example. The keyword-sentiment analysis system 100 may identify sentiment expressions (602) via APIs 502 to locate and retrieve web-based sentiment expressions, call center transcription systems 506, and any other systems configured to locate and retrieve expressions containing sentiment capable of being analyzed. The keyword-sentiment analysis system 100 may determine if any keywords are present in sentiment expressions under analysis (604). If no keywords are present, the keyword-sentiment analysis system 100 may continue identifying relevant sentiment expressions or may halt operation until the next initiation.

Upon identification of sentiment expressions containing keywords, the keyword-sentiment analysis system 100 may map the keyword-containing sentiment expression to one or more keyword hierarchies (606). The mapping may include association of the keyword-containing sentiment expressions to one or more subgroups or keyword lists in a hierarchy such as that described in FIGS. 2 and 3. Upon mapping the keyword-containing sentiment expressions, the keyword-sentiment analysis system 100 may determine if any weighting factors (WT) have been updated (608). In one example, the update may have been performed prior current operation of the keyword-sentiment analysis system 100 or may be actively changed during operation via user-based input. After the update (610) or if no update has occurred, a sentiment-scoring algorithm may be selected if more than one is available (612). This may be a system-based selection using predetermined criteria, may be user-input based, or may be some combination thereof.

The keyword-sentiment analysis system 100 may score the keyword-containing sentiment expressions according to the keyword hierarchies (614). The scoring may be done for each keyword-containing sentiment expression with respect to each associated keyword subgroup. Upon completion of the sentiment scoring, the sentiment scores may be analyzed to be presented in a predetermined manner and presented such as on a display (616).

The term "memory" or "memories" used herein may include one or more memories and may be computer-readable storage media or memories, such as a cache, buffer, RAM, removable media, hard drive, flash drive or other computer-readable storage media. Computer-readable storage media may include various types of volatile and non-volatile storage media. Processors described herein may implement various processing techniques such as multiprocessing, multitasking, parallel processing and the like, for example.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A sentiment-scoring system, comprising:
a storage device configured to store a plurality of keywords, keyword groups, and a keyword group hierarchy, wherein each keyword is associated with at least one of the keyword groups, and wherein the keyword hierarchy comprises a hierarchy associated with each keyword group;
a processor in communication with the storage device, the processor configured to:
locate a plurality of sentiment expressions;
identify a plurality of keywords present in the plurality of sentiment expressions;
determine at least one respective keyword group associated with each identified keyword;
determine a sentiment score for each sentiment expression with respect to the associated at least one respective keyword group within the keyword hierarchy, wherein each sentiment score is indicative of a level of sentiment about the associated at least one respective keyword group; and
provide at least one determined sentiment score to a display.

2. The sentiment-scoring system of claim 1, wherein each keyword group includes a plurality of keyword subgroups, wherein each keyword subgroup is associated with at least one keyword, wherein at least one subgroup is configured to serve as a parent keyword subgroup to a plurality of other keyword subgroups, wherein each of the plurality of other subgroups may be associated with a respective keyword and respective keyword sentiment score indicative of a respective level of sentiment associated with the respective keyword, and wherein each of the respective keyword sentiment scores may be combined to create an overall sentiment score for the parent keyword subgroup.

3. The sentiment-scoring system of claim 2, wherein each of the other keyword subgroups is associated with a respective weighting factor, wherein each weighting factor is indicative of a relative level of impact of the associated sentiment.

4. The sentiment-scoring system of claim 3, wherein each of the respective weighting factors is a percentage with respect to the parent keyword subgroup.

5. The sentiment-scoring system of claim 3, wherein at least one of the respective weighting factors and the percentages are user-adjustable.

6. The sentiment-scoring system of claim 1, wherein the processor is further configured to locate a plurality of sentiment expressions on at least one social network.

7. The sentiment-scoring system of claim 1, wherein each of the other keyword subgroups may serve as a parent keyword subgroup to additional other keyword subgroups.

8. A method comprising:
locating, with a processor, a plurality of sentiment expressions;
identifying, with the processor, a plurality of predetermined keywords present in the plurality of sentiment expressions, wherein each keyword is included in at least one of a plurality of keyword groups, wherein each keyword group includes an associated keyword hierarchy;
determining, with the processor, at least one respective keyword group associated with each identified keyword;

determining, with the processor, a sentiment score for each sentiment expression with respect to the associated at least one keyword group within the keyword hierarchy, wherein each sentiment score is indicative of a level of sentiment about the associated at least one keyword group; and providing, with the processor, at least one determined sentiment score to a display.

9. The method of claim 8, wherein determining, with the processor, at least one respective keyword group associated with each identified keyword comprises identifying, with the processor, a plurality of keyword subgroups included in at least one of the keyword group, wherein each keyword subgroup is associated with at least one keyword, wherein at least one subgroup is configured to serve as a parent keyword subgroup to a plurality of other subgroups, wherein each of the plurality of other subgroups may be associated with a respective keyword, wherein determining, with the processor, a sentiment score for each sentiment expression with respect to the associated at least one keyword group within the keyword hierarchy comprises determining, with the processor, a respective keyword sentiment score for each of the other keyword subgroups, wherein each of the respective keyword sentiment scores is indicative of a respective level of sentiment associated with the respective keyword, and wherein each of the respective keyword sentiment scores are combined to create an overall sentiment score for the parent keyword subgroup.

10. The method of claim 9, wherein each of the other keyword subgroups is associated with a respective weighting factor, wherein each weighting factor is indicative of a relative level of impact of the associated sentiment, and wherein determining, with the processor, a sentiment score for each sentiment expression with respect to the associated at least one keyword group within the keyword hierarchy comprises determining, with the processor, a respective keyword sentiment score for each of the other keyword subgroups based on the respective weight factor.

11. The method of claim 10, wherein each of the respective weighting factors is a percentage with respect to the parent keyword subgroup.

12. The method of claim 10, further comprising receiving, with the processor, user-input to adjust at least one of the respective weighting factors.

13. The method of claim 8, wherein locating, with a processor, the plurality of sentiment expressions comprises locating, with a processor, a plurality of sentiment expressions on at least one social network.

14. The method of claim 8, wherein each of the other keyword subgroups may serve as a parent keyword subgroup to additional other keyword subgroups.

15. A computer-readable medium encoded with a plurality of instructions executable by a processor, the plurality of instructions comprising:

instructions to locate a plurality of sentiment expressions;

instructions to identify a plurality of predetermined keywords present in the plurality of sentiment expressions, wherein each keyword is included in at least one of a plurality of keyword groups, wherein each keyword group includes an associated keyword hierarchy;

instructions to determine at least one respective keyword group associated with each identified keyword;

instructions to determine a sentiment score for each sentiment expression with respect to the associated at least one keyword group within the keyword hierarchy, wherein each sentiment score is indicative of a level of sentiment about the associated at least one keyword group; and instructions to provide at least one determined sentiment score to a display.

16. The computer-readable medium of claim 15, wherein the instructions to determine at least one respective keyword group associated with each identified keyword comprise instructions to identifying a plurality of keyword subgroups included in at least one of the keyword group, wherein each keyword subgroup is associated with at least one keyword, wherein at least one subgroup is configured to serve as a parent keyword subgroup to a plurality of other subgroups, wherein each of the plurality of other subgroups may be associated with a respective keyword, wherein the instructions to determine a sentiment score for each sentiment expression with respect to the associated at least one keyword group within the keyword hierarchy comprise instructions to determine a respective keyword sentiment score for each of the other keyword subgroups, wherein each of the respective keyword sentiment scores is indicative of a respective level of sentiment associated with the respective keyword, and wherein each of the respective keyword sentiment scores are combined to create an overall sentiment score for the parent keyword subgroup.

17. The computer-readable medium of claim 16, wherein each of the other keyword subgroups is associated with a respective weighting factor, wherein each weighting factor is indicative of a relative level of impact of the associated sentiment, and wherein the instructions to determine the sentiment score for each sentiment expression with respect to the associated at least one keyword group within the keyword hierarchy comprise instructions to determine a respective keyword sentiment score for each of the other keyword subgroups based on the respective weight factor.

18. The computer-readable medium of claim 17, wherein each of the respective weighting factors is a percentage with respect to the parent keyword subgroup.

19. The computer-readable medium of claim 17, wherein the plurality of instructions further comprise instructions to receive user-input to adjust at least one of the respective weighting factors.

20. The computer-readable medium of claim 15, wherein the instructions to locate the plurality of sentiment expressions comprise instructions to locate a plurality of sentiment expressions on at least one social network.

* * * * *